(12) United States Patent
Itaya et al.

(10) Patent No.: US 8,902,190 B2
(45) Date of Patent: Dec. 2, 2014

(54) TOUCH PANEL

(75) Inventors: Hisao Itaya, Yasu (JP); Tsutomu Yamada, Kameoka (JP); Masahiro Hosoe, Kameoka (JP)

(73) Assignee: Gunze Limited, Kyoto (JP)

( * ) Notice: Subject to any disclaimer, the term of this patent is extended or adjusted under 35 U.S.C. 154(b) by 377 days.

(21) Appl. No.: 12/601,157

(22) PCT Filed: May 22, 2008

(86) PCT No.: PCT/JP2008/059427
§ 371 (c)(1),
(2), (4) Date: Nov. 20, 2009

(87) PCT Pub. No.: WO2008/143316
PCT Pub. Date: Nov. 27, 2008

(65) Prior Publication Data
US 2010/0156826 A1    Jun. 24, 2010

(30) Foreign Application Priority Data

May 24, 2007  (JP) ................................ 2007-138215
Jan. 15, 2008  (JP) ................................ 2008-006010

(51) Int. Cl.
*G06F 3/045*  (2006.01)

(52) U.S. Cl.
CPC ...... *G06F 3/045* (2013.01); *G06F 2203/04113* (2013.01)
USPC ......................................... 345/174; 345/173

(58) Field of Classification Search
USPC ................................................. 345/173, 174
See application file for complete search history.

(56) References Cited

U.S. PATENT DOCUMENTS

| 4,725,695 | A | * | 2/1988 | Murdock et al. ............... 345/174 |
| 4,822,957 | A | * | 4/1989 | Talmage et al. ............ 178/18.05 |
| 5,815,141 | A | * | 9/1998 | Phares .......................... 345/173 |
| 6,163,313 | A | * | 12/2000 | Aroyan et al. ................ 345/173 |
| 2003/0231169 | A1 | | 12/2003 | Aroyan et al. |
| 2005/0184965 | A1 | * | 8/2005 | Geaghan et al. ............. 345/173 |
| 2010/0156826 | A1 | * | 6/2010 | Itaya et al. .................... 345/173 |

FOREIGN PATENT DOCUMENTS

| JP | 04-137026 A | | 5/1992 | |
| JP | 2001-125724 A | | 5/2001 | |
| JP | 2001125724 A | * | 5/2001 | ................ G06F 3/03 |

OTHER PUBLICATIONS

Canadian Office Action of the corresponding Canadian application No. 2,687,644, dated Oct. 11, 2013.

* cited by examiner

*Primary Examiner* — Sumati Lefkowitz
*Assistant Examiner* — Jose Soto Lopez
(74) *Attorney, Agent, or Firm* — Global IP Counselors, LLP

(57) ABSTRACT

In a touch panel, a rectangular resistive film is formed on a substrate and electrodes are provided along the four sides of the resistive film. Each electrode includes a plurality of gaps and a plurality of divided electrodes. The divided electrodes are linearly arranged along the corresponding side of the resistive film, and the electrode, in which the divided electrodes at both ends are connected to terminals, respectively, is formed by arranging the divided electrodes of the same shape and repeating this same shape.

4 Claims, 16 Drawing Sheets

Inner electrode 24a : Inner electrode 24b = 0.5 : 1

Inner electrode 24a : Inner electrode 24b = 0.1 : 1

Inner electrode 24a : Inner electrode 24b = 0.2 : 1

Inner electrode 24a : Inner electrode 24b = 0.25 : 1

Inner electrode 24a : Inner electrode 24b = 0.3 : 1

PRIOR ART

PRIOR ART

PRIOR ART

TOUCH PANEL

CROSS-REFERENCE TO RELATED APPLICATIONS

This U.S. National stage application claims priority under 35 U.S.C. §119 (a) to Japanese Patent Application No. 2007-138215, filed in Japan on May 24, 2007, the entire contents of which are hereby incorporated herein by reference.

BACKGROUND OF THE INVENTION

1. Field of the Invention

The present invention relates to a touch panel of an input device used in a computer and the like, and particularly relates to a 5-wire touch panel.

2. Description of the Related Art

Prevalent touch panels include resistive types, surface acoustic wave types, capacitive types, infrared types, and the like. Further, resistive types include those termed a 4-wire type and a 5-wire type. For example, a 5-wire touch panel is disclosed in Japanese Laid-Open Patent Publication No. 04-137026.

In a 5-wire touch panel shown in FIG. 16, transparent rectangular resistive films 14 are laminated on opposing surfaces of two substrates 12a and 12b, respectively. Although not shown in the figures, spacers are provided so that both substrates 12a and 12b oppose each other at a particular distance. Electrodes 56a, 56b, 56c, and 56d are formed on the four sides of either one of the resistive films 14 (FIG. 17). The substrate on which the electrodes 56a, 56b, 56c, and 56d are formed is the substrate 12a, and the substrate opposing the substrate 12a is the substrate 12b.

FIG. 17 shows the substrate 12a and the peripheral circuitry thereof. A positive voltage is applied to both ends of the first electrode 56a and a negative voltage is applied to both ends of the second electrode 56b, so that a potential gradient is formed between the first electrode 56a and the second electrode 56b. Then, after switching, voltages are applied to the third electrode 56c and the fourth electrode 56d, similarly to the above, so that a potential gradient is formed therebetween. When these two potential gradients are repeatedly switched in a short time by switches S1, S2, S3, and S4, the potential gradients are alternately formed horizontally and vertically on the substrate 12a. When the flexible substrate 12b is touched, the resistive films 14 make contact with each other, and therefore the substrate 12b can measure the potential formed on the substrate 12a. The location of the touch is obtained by detecting the potential at the time of the touch.

In order to prevent leakage current from flowing through the electrodes 56a, 56b, 56c, and 56d, normally, the electrodes 56a, 56b, 56c, and 56d are each provided with a moderate resistance. Due to this, the equipotential lines distort near each electrode. Conventionally, in order to prevent the distortion, the shape of an electrode that is less likely to cause distortion is sought and determined by trial and error. For example, as in Japanese Laid-Open Patent Publication No. 04-137026, it is proposed that electrodes 58 be T-shaped (FIG. 18).

However, it is difficult to design the T-shaped electrodes 58 disclosed in Japanese Laid-Open Patent Publication No. 04-137026, due to variations in size of the T-shape, and the like. Particularly, the determination of the shapes of the electrodes 58 by trial and error requires a great deal of effort. In addition, the electrodes 58 that protrude the furthest inward to the resistive film 14 limit the usable area of the resistive film 14.

SUMMARY OF THE INVENTION

Therefore, an object of the present invention is to provide a touch panel that includes electrodes easily designed and manufactured, and also includes a resistive film on which horizontal and vertical equipotential lines are formed with necessary and sufficient uniformity.

In a first preferred embodiment, a touch panel according to the present invention comprises: two substrates opposing each other at a particular distance; resistive films formed on opposing surfaces of the substrates, respectively; and electrodes formed along four sides of one of the resistive films, and each of the electrodes includes a plurality of divided electrodes that are linearly arranged and gaps between the divided electrodes, and a ratio of a length of a portion, for applying voltage to the resistive film, of each of the divided electrodes at both ends to a length of a portion, for applying voltage to the resistive film, of each of the other divided electrodes is from 0.1:1 to 0.5:1.

The division of the electrode into the divided electrodes by the plurality of gaps provides the electrode with a desired resistance. In the present invention, it is designed so that the ratio of each of the divided electrodes at both ends to the length of each of the other divided electrodes is from 0.1:1 to 0.5:1. Voltage is applied to the resistive film through each divided electrode so that a potential gradient may be created. At this time, when the equipotential lines distort, the portion of the equipotential lines that distorts more than necessary is not used, and the portion that is necessarily and sufficiently linear is used as a touch panel.

In a second preferred embodiment of a touch panel according to the present invention, adjacent divided electrodes among the divided electrodes oppose each other with a gap therebetween, and a resistance value of a resistance between the adjacent divided electrodes is determined based on the shape of the gap and a sheet resistance of the resistive film. In the present invention, the resistance values of all the resistances are substantially the same by making substantially the same, gap widths and opposing lengths of all areas across which the divided electrodes oppose each other.

In a third preferred embodiment of a touch panel according to the present invention, a portion of the resistive film may be removed to form an insulating portion in the gap.

Advantages of the Invention

In the present invention, the gaps between all the divided electrodes are of the same shape, and the distortion of the equipotential lines can be made as little as possible by adjusting the ratio of the length of each of the divided electrodes at both ends to the length of each of the other divided electrodes. This makes it possible to reduce the distortion of the equipotential lines more easily than in the case of individually adjusting the sizes of the T-shapes, which are described in Japanese Laid-Open Patent Publication No. 04-137026.

The design is easily made by making the shapes of all the gaps substantially the same. In addition, when the electrodes are made pectinate, it is possible to prevent the electrodes other than the electrodes on the innermost side from affecting the formation of the equipotential lines.

DESCRIPTION OF THE PREFERRED EMBODIMENTS

An embodiment of a touch panel according to the present invention is described. The touch panel is of a resistive type, and particularly of a 5-wire type. In a 5-wire touch panel, two substrates oppose each other at a particular distance, and rectangular resistive films are formed on the opposing surfaces of the substrates, respectively. Spacers are provided between the substrates so that when one of the substrates bends by being pressed by a finger or the like, the resistive films of both substrates make contact with each other. As the substrates, a plastic substrate formed of polyester or the like, or a glass substrate formed of soda glass or the like is used. As the resistive films, ITO (Indium Tin Oxide) or the like is used. The substrates and the resistive films are both transparent. Electrodes are formed on the four sides of either one of the resistive films. The present invention is characterized by the electrodes. The peripheral circuitry and the like other than the electrodes may be the same as those of the related art.

Figure 1:
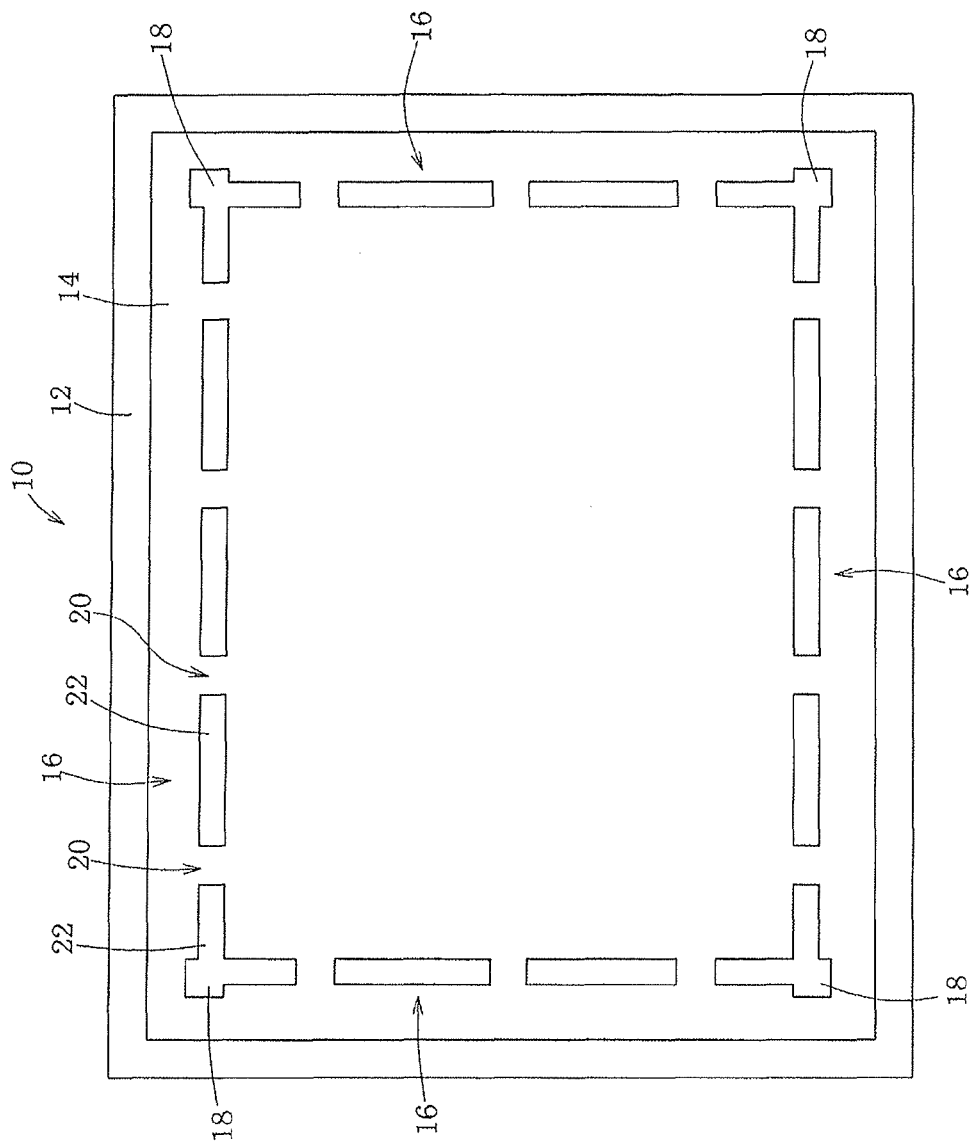
FIG. 1 is a schematic diagram showing electrodes of a touch panel according to the present invention.

As shown in FIG. 1, in a touch panel 10, a rectangular resistive film 14 is formed on a substrate 12, and electrodes 16 are linearly arranged along the four sides of the resistive film 14. The electrodes 16 are placed as close to the periphery of the resistive film 14 as possible so that the usable area of the resistive film 14 may increase. To the electrodes 16, voltage is applied from power supply terminals 18 attached to the four corners of the resistive film 14. Each electrode 16 is divided into a plurality of electrodes (hereinafter, "divided electrodes 22") by a plurality of gaps 20. The divided electrodes 22 are linearly arranged along the corresponding side of the resistive film 14, and the divided electrodes 22 at both ends are connected to the respective terminals 18.

The reason for the provision of the gaps 20 in the electrode 16 is, as described for the related art, to provide the electrode 16 with a moderate resistance. For example, if the resistive film 14 is formed of ITO and the electrode 16 is formed of a silver paste, the resistance of the electrode 16 becomes too low compared to that of the resistive film 14, without the gaps 20. This causes leakage current to flow through the electrode 16 when not driven. The gaps 20 provide the electrode 16 with a moderate resistance. The resistance of the electrode 16 is determined so that leakage current may be prevented and the equipotential lines of the resistive film 14 distort as little as possible. For example, the sheet resistance of the resistive film 14 is set from approximately one hundred to several thousands of $\Omega/\square$, and the sum total of the resistances between the power supply terminals 18 in the electrode 16 is set from several tens to several hundreds of $\Omega$. The sum total of the resistances may be calculated from the value of the sheet resistance of the resistive film 14, and specifically, is preferably set from approximately 50 to 100$\Omega$.

Figure 2:
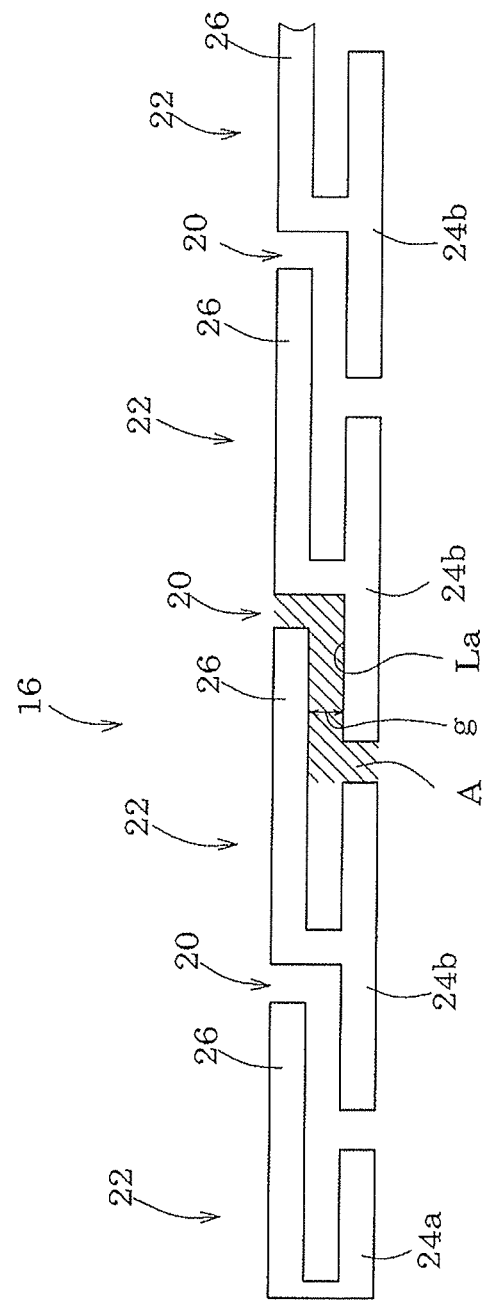
FIG. 2 is a diagram showing specific shapes of electrodes.

FIG. 2 shows a specific example of the divided electrodes 22. The upper side of the figure corresponds to the peripheral side of the resistive film 14, and the lower side corresponds to the inner side of the resistive film 14. The divided electrodes 22 include linear portions (hereinafter, "inner electrodes 24a and 24b") that are placed on the innermost side of the resistive film 14 and that affect the formation of the equipotential lines, and voltage is applied to the resistive film 14 through the linear portions. The application of the voltage to the resistive film 14 through the inner electrodes 24a and 24b creates a potential gradient in the resistive film 14. The inner electrodes 24a and 24b are linearly arranged, parallel to the corresponding side of the resistive film 14. Of pectinate portions, the portions other than the inner electrodes 24a and 24b are outer electrodes 26. The gaps 20 are formed by causing the inner electrodes 24a and 24b and the outer electrodes 26 to oppose each other, and all the gaps 20 are of the same shape. This same shape also includes the case of symmetry as shown below in FIG. 7.

The electrode 16 is formed by arranging the divided electrodes 22 of the same shape and repeating this same shape. The ratio of the length of each of the inner electrodes 24a at both ends to the length of each of the other inner electrodes 24b is from 0.1:1 to 0.5:1. In the case of FIG. 2, the lengths of the inner electrodes 24a and 24b refer to lateral lengths.

Figure 3:
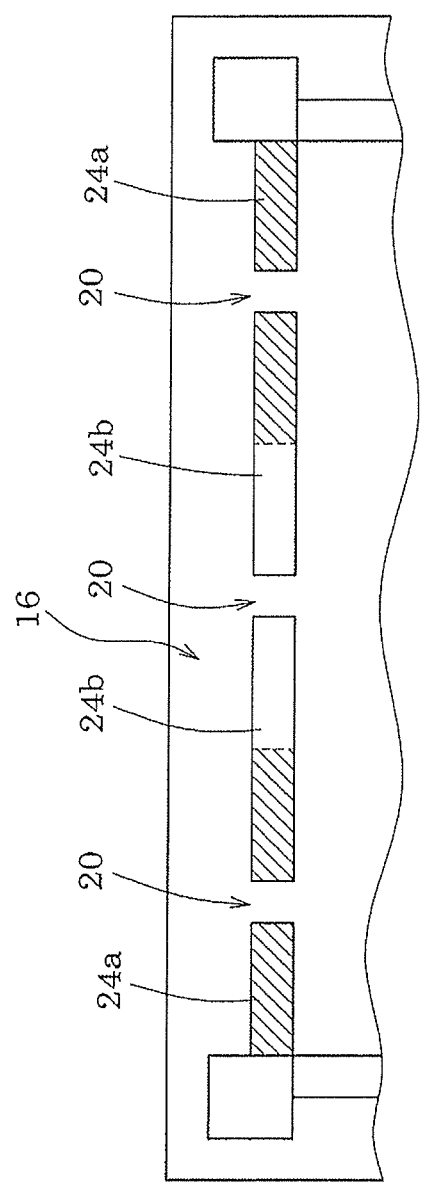
FIG. 3 is a diagram showing an equal division of electrodes.

FIG. 3 shows the case where the ratio of each of the inner electrodes 24a at both ends to each of the other inner electrodes 24b is 0.5:1, i.e., the case where the length of each of the inner electrodes 24a at both ends is half or approximately half the length of each of the other inner electrodes 24b. When three of the gaps 20 are provided as shown in FIG. 3, the number of the inner electrodes 24a and 24b is four. The length of each of the two inner electrodes 24a at both ends is half the length of each of the other two inner electrodes 24b. The resistances created by the gaps 20 are the same or substantially the same in value at any position. For example, in order to provide one electrode 16 with a resistance of 100Ω, ten of the gaps 20 are formed, each having a resistance value of 10Ω.

The divided electrodes 22 are simpler in shape than the ones that are disclosed in Japanese Laid-Open Patent Publication No. 04-137026, and therefore are easily designed. Unlike the electrodes that are disclosed in Japanese Laid-Open Patent Publication No. 04-137026, the electrodes in the present application do not extend toward the center of the resistive film 14, and consequently, the usable area of the resistive film 14 increases.

Next, a description is given of the resistances created by the gaps 20. Referring to FIG. 2, in each gap 20, the area that operates as a resistance is an area represented by character A, across which the divided electrodes 22 oppose each other. When the sheet resistance of the resistive film 14 is Rs; the width of the gap 20 is g; and the length of the opposing portion of the divided electrodes 22 is La, the resistance R created by the gap 20 is represented by an equation of the form R=Rs× g/La. From this equation it is understood that the resistance R created by the gap 20 is determined based on the sheet resistance of the resistive film 14 and the shape of the gap 20. Since the sheet resistance of the resistive film 14 is predetermined, the resistance R can be adjusted by the gap width g and the length La. For example, after the gap width g is fixed, the divided electrodes 22 are made pectinate as in an electrode 16b of FIG. 4, and the pectinate portions of adjacent divided electrodes 22 are alternately placed. The resistance R can be adjusted by adjusting the length La by the pectinate portions.

Even when the gap width g varies in some parts of the area represented by character A, the above equation of the resistance R is a general equation, and therefore an accurate resistance can be obtained from the sum of the resistances of all the parts. Alternatively, if the width of the electrode 16 is so small that the resistance of the electrode itself cannot be neglected, this resistance is added.

In practice, the electrodes 16 are formed by: (1) preparing the substrate 12 of a desired shape; (2) laminating the resistive film 14 on the substrate 12 so as to have a rectangular shape, using a lamination technique such as sputtering or printing; and (3) screen-printing a conductive paste such as a silver paste on the four sides of the resistive film 14. It is remarkably easy to form the electrodes 16. Since the electrodes 16 are provided with desired resistances not by the thicknesses or widths of the electrodes 16, the thickness of each electrode 16 does not have to be even. Since it is not necessary to be concerned about the variation of the thickness of each electrode 16, the yield increases. The material that forms the electrodes 16 is not limited to a silver paste, and the manufacturing process of the electrodes 16 is not limited to screen printing.

In the present invention, the resistances created in the equally divided portions of the electrode 16 are the same in value at any position. Accordingly, the gap widths and the opposing lengths of all the areas across which the divided electrodes 22 oppose each other are the same or substantially the same. The design and manufacturing become easy by thus making the values of all the resistances created by the gaps 20 the same.

Figure 5:
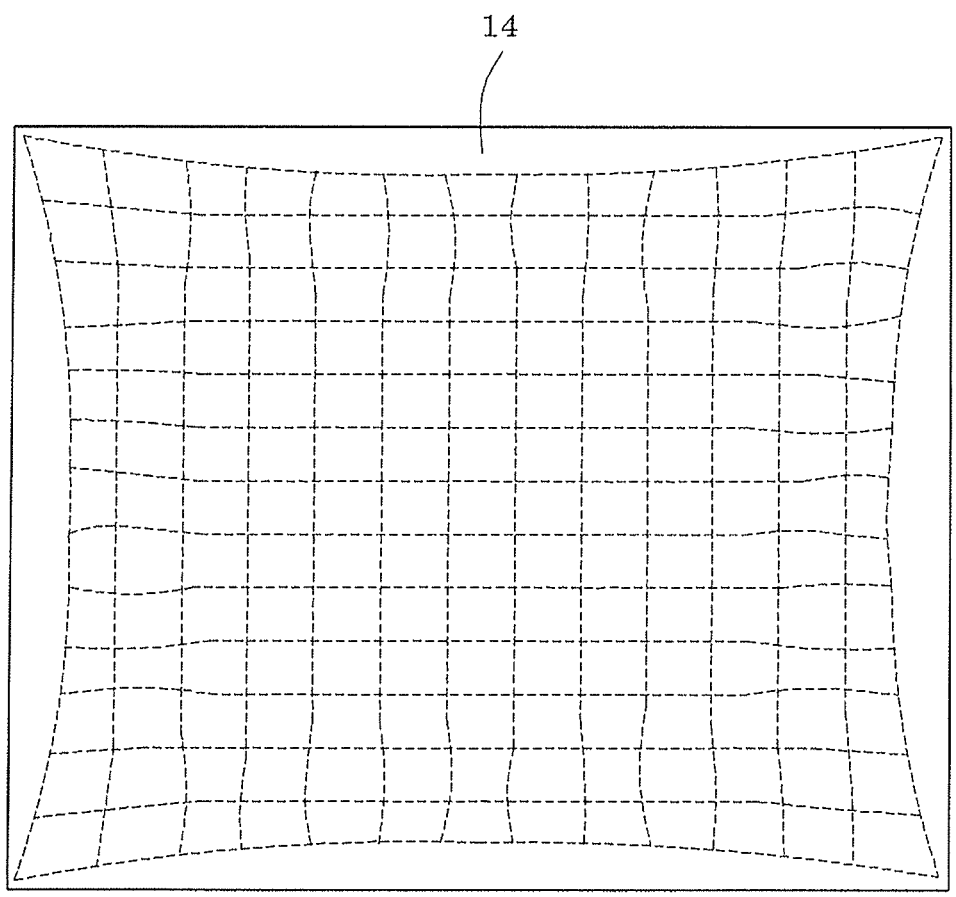
FIG. 5 is a diagram showing the equipotential lines formed on a resistive film when the ratio of the length of an inner electrode 24a to the length of an inner electrode 24b is 0.5:1.

FIG. 5 shows simulation results for the equipotential lines obtained when the ratio of the length of each of the inner electrodes 24a to the length of each of the inner electrodes 24b is 0.5:1. In the figure, the equipotential lines are represented by dashed lines. The equipotential lines are formed roughly parallel vertically and horizontally, except for the distortion at the corners.

Figure 4:
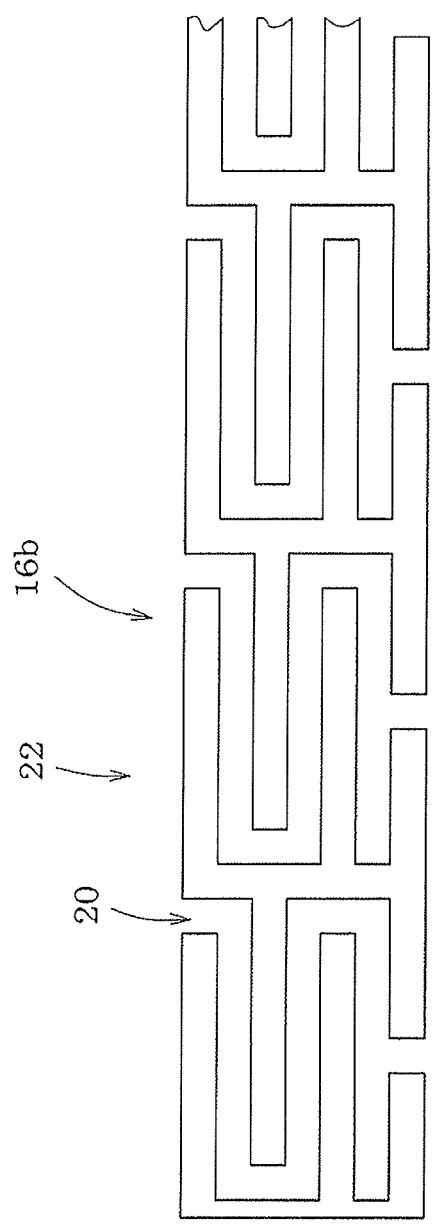
FIG. 4 is a diagram showing a resistance adjustment of the electrodes of FIG. 2.
Figure 6:
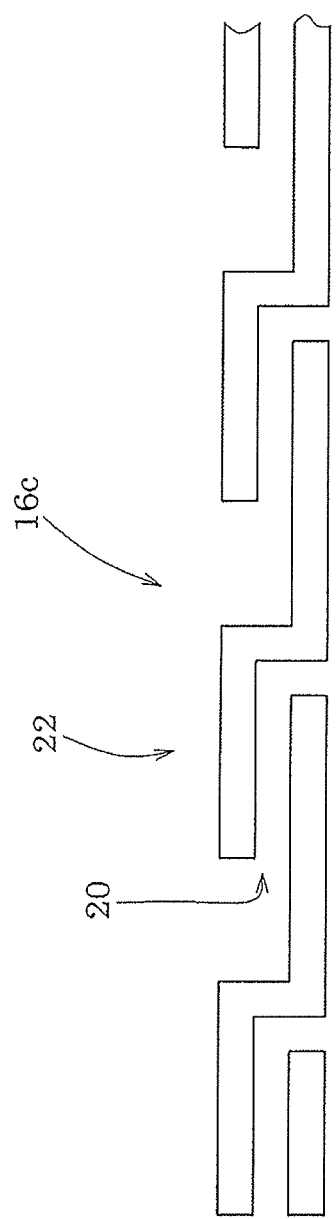
FIG. 6 is a diagram showing an electrode obtained by reducing the portions of gaps that do not operate as resistances, as much as possible.

As shown in FIG. 6, the shape of the electrode may be that of an electrode 16c, which is simpler in structure than those of FIGS. 2 and 4. In the gap 20, the portion that does not operates as a resistance is smaller than that of FIG. 2.

Figure 7:
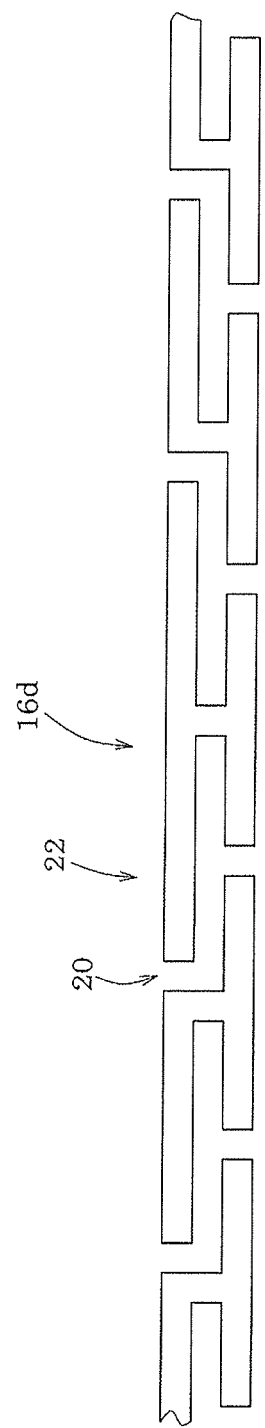
FIG. 7 is a diagram showing an electrode obtained by making the electrodes of FIG. 2 symmetrical.
Figure 8:
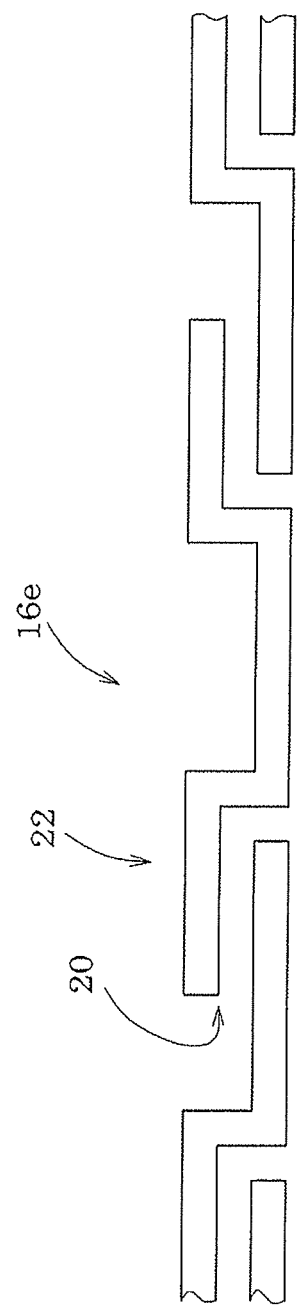
FIG. 8 is a diagram showing an electrode obtained by making the electrodes of FIG. 4 symmetrical.
Figure 9:
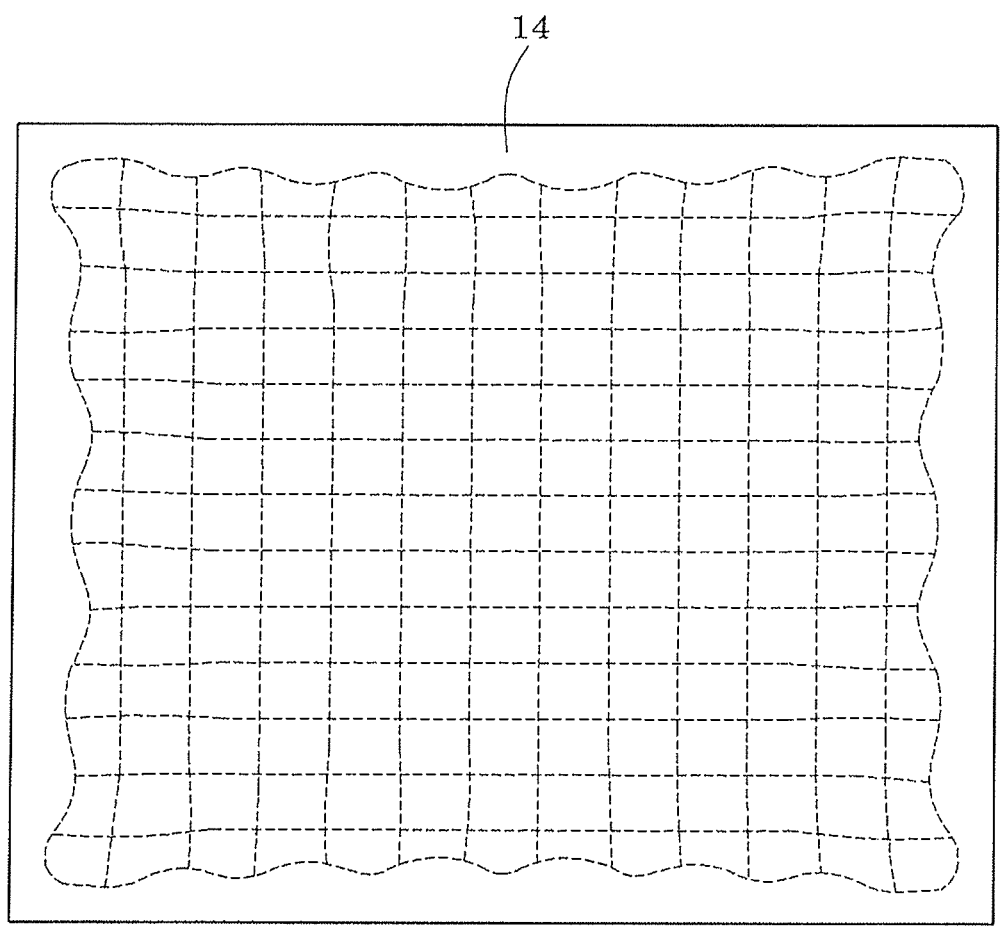
FIG. 9 is a diagram showing the equipotential lines formed on the resistive film when the ratio of the length of the inner electrode 24a to the length of the inner electrode 24b is 0.1:1.
Figure 10:
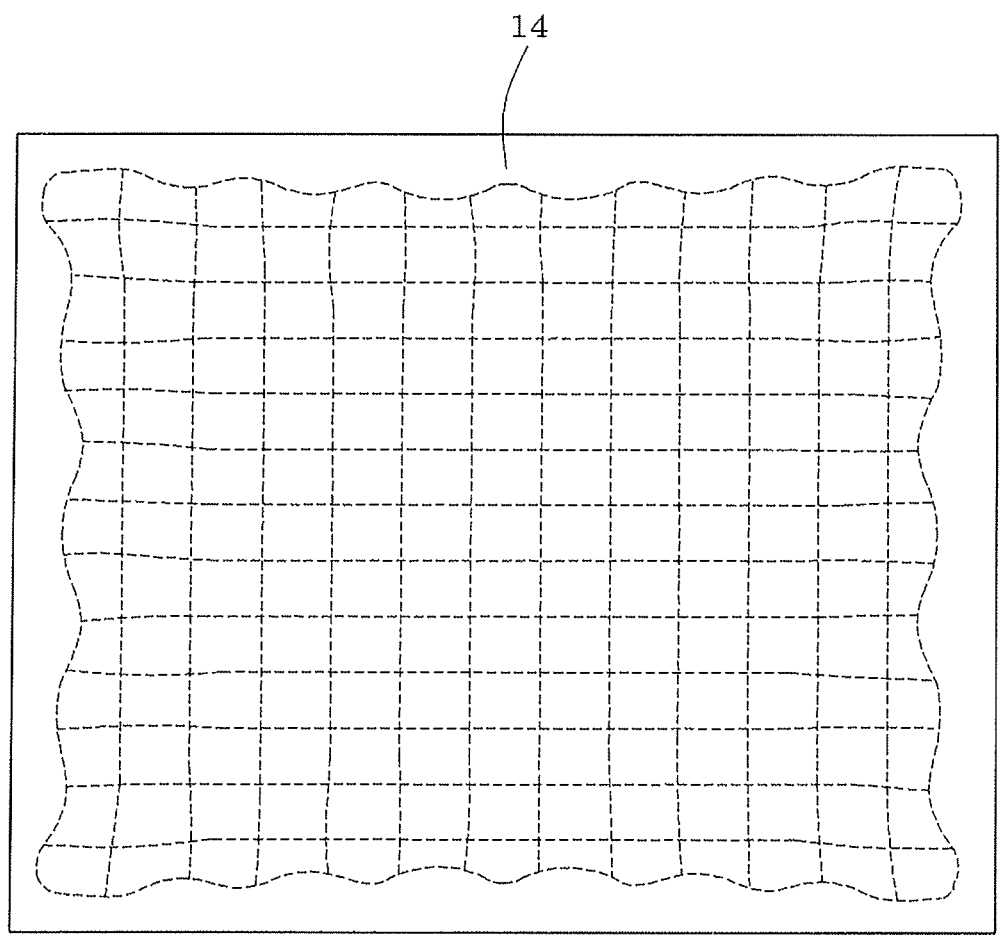
FIG. 10 is a diagram showing the equipotential lines formed on the resistive film when the ratio of the length of the inner electrode 24a to the length of the inner electrode 24b is 0.2:1.
Figure 11:
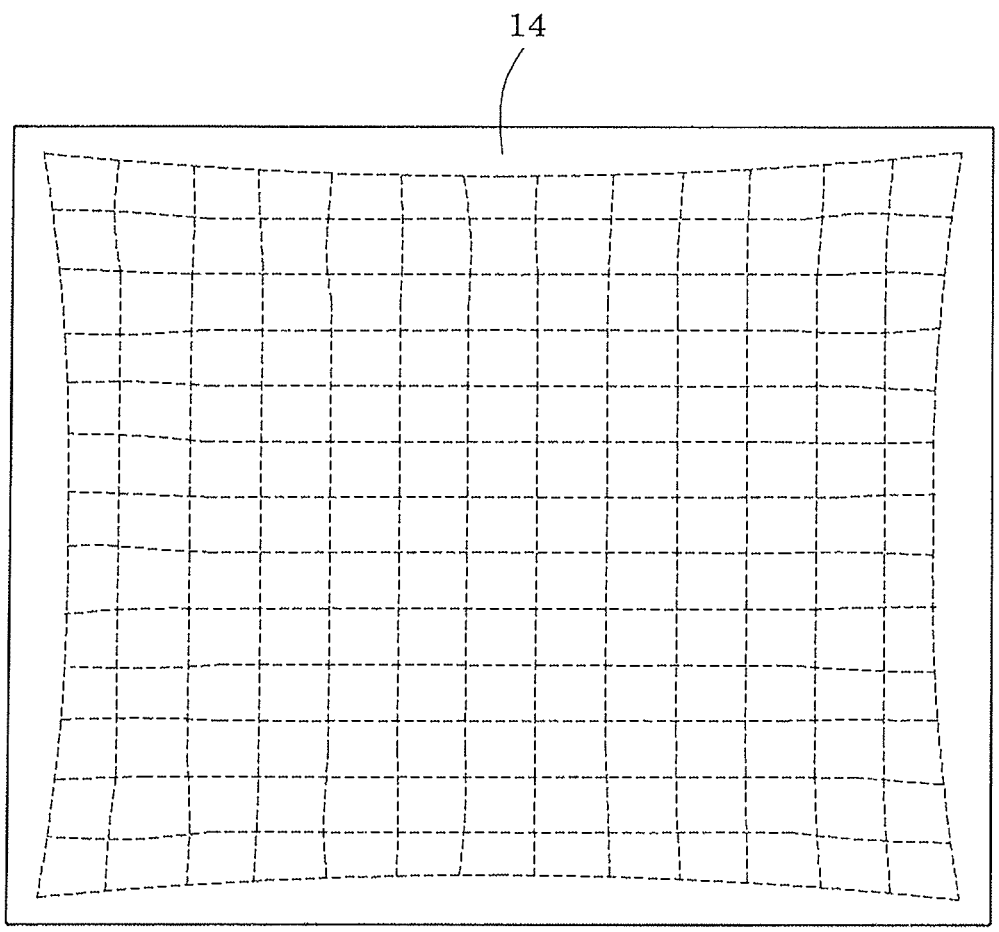
FIG. 11 is a diagram showing the equipotential lines formed on the resistive film when the ratio of the length of the inner electrode 24a to the length of the inner electrode 24b is 0.25:1.
Figure 12:
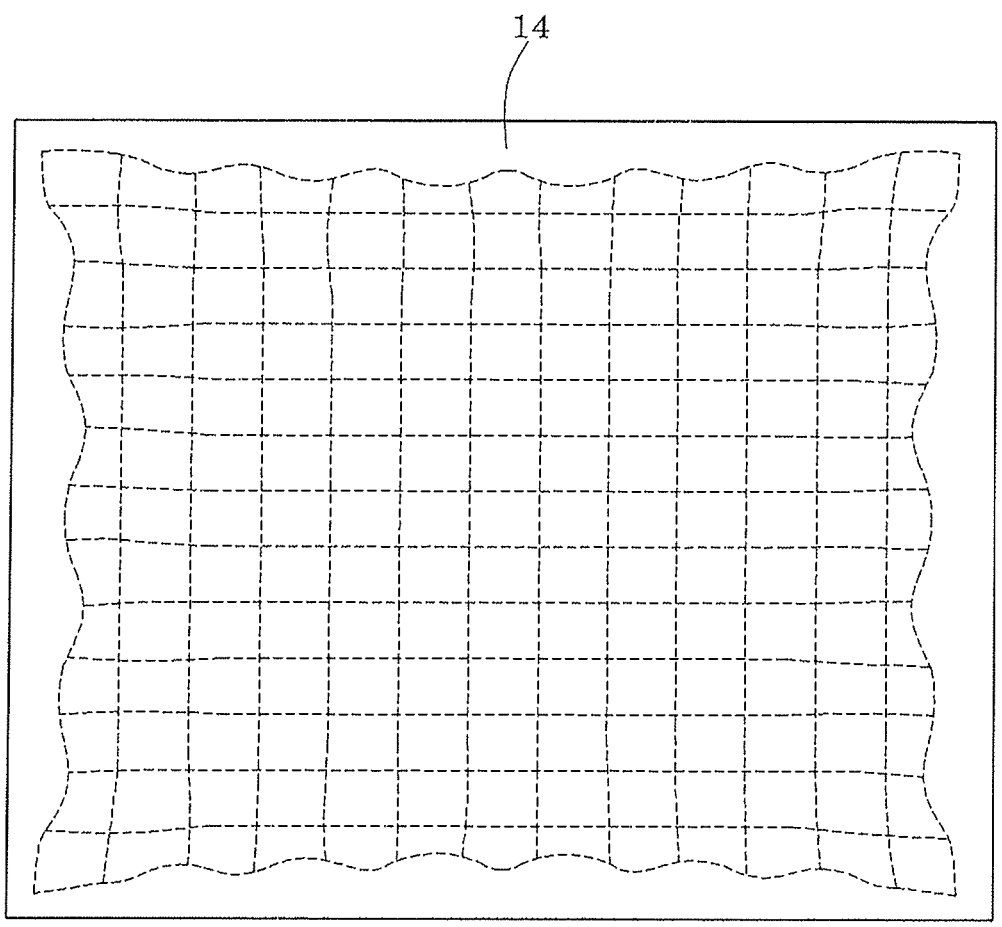
FIG. 12 is a diagram showing the equipotential lines formed on the resistive film when the ratio of the length of the inner electrode 24a to the length of the inner electrode 24b is 0.3:1.

As shown in FIGS. 7 and 8, electrodes 16d and 16e may each be symmetrical with respect to a line at the midpoint of the long axis. These electrodes 16d and 16e are obtained by making the electrodes 16 and 16c of FIGS. 2 and 6 symmetrical, respectively. Although symmetrical with respect to the line at the midpoint, the inner electrodes 24 are the same as those of FIGS. 2 and 6, and therefore the application of voltage to the resistive film 14 is also the same. The design and manufacturing are not so different from and are as easy as those of FIGS. 2 and 6.

If the distortion of the equipotential lines at the corners, which is described above and shown in FIG. 5, can be reduced, the usable area of the resistive film 14 increases. The reason for the distortion of the equipotential lines is considered that inner electrodes 24a directed in two directions are connected to each other at each corner via the corresponding power supply terminal 18, and therefore cannot be completely separate from each other. Accordingly, the lengths of the inner electrodes 24a at each end are reduced so that the effect of the inner electrodes 24a on the formation of the equipotential lines is reduced. FIGS. 9 through 12 show the equipotential lines obtained when the ratio of the length of each of the inner electrodes 24a at ends to the length of each of the other inner electrodes 24b is from 0.1:1 to 0.3:1. The equipotential lines are represented by dashed lines, and the electrodes 16 are not shown.

When the ratio of the lengths is 0.1:1 (FIG. 9) and 0.2:1 (FIG. 10), the equipotential lines are round at the corners. It is confirmed that in the case of 0.25:1 (FIG. 11), the roundness and the sharpness of the equipotential lines at the corners are eliminated such that the distortion of the equipotential lines at the corners is moderated. In the case of 0.3:1 (FIG. 12), the equipotential lines sharpen at the corners. It is understood that when the ratio of the lengths is 0.25:1, the equipotential lines are formed most evenly. If it is acceptable that the usable area of the resistive film 14 decreases to some extent, the cases of FIGS. 9, 10, and 12 may also be applied. All the gaps 20 are of the same shape. Note further that the reason for the undulation of the equipotential lines in the peripheral portion of the resistive film 14 is the effect of the division of each electrode 16 into the plurality of inner electrodes 24a and 24b.

Figure 13:
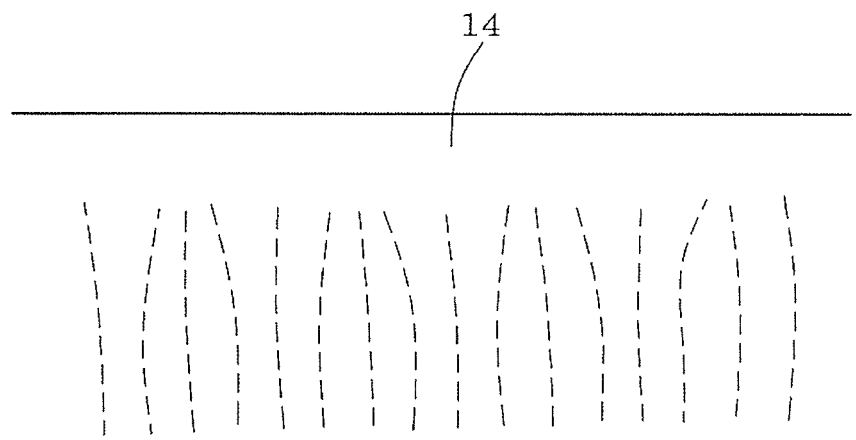
FIG. 13 is a diagram showing the equipotential lines perpendicular to electrodes becoming sparse/dense while distorting near the electrodes.

In addition, when each of the inner electrodes 24a and 24b has a maximum designable length, the equipotential lines that are formed perpendicularly to the inner electrodes 24a and 24b may become sparse/dense while distorting near the inner electrodes 24a and 24b (dashed lines of FIG. 13). The sparse/ dense portion cannot be used as a touch panel, and therefore the usable area needs to decrease. It is preferable to make the sparse/dense portion of the equipotential lines as small as possible. As a remedy for this, it is possible to make the length of each of the inner electrodes 24a and 24b smaller than the maximum designable length. For example, the length of each of the inner electrodes 24b of FIG. 7 can be reduced to that of shaded areas of FIG. 14. For example, the length of each of the inner electrodes 24a and 24b is set from 1.0 to 0.1 times as long as the maximum designable length. The inner electrodes 24a and 24b become shorter than the outer electrodes. Although the length that is 1.0 times as long, which is the maximum designable length, is included, 1.0 times may be applied, if the sparse/dense portion of the equipotential lines is an area that is unproblematic for practical use, or if it is acceptable that the usable area decreases to some extent.

The maximum designable length refers to the maximum length of each of the divided electrodes 22 when the divided electrodes 22 and the gaps 20 are formed by screen printing, and also to the length obtained when the divided electrodes 22 extend from the right and left (or the top and bottom) such that the ends of the divided electrodes 22 form the gaps 20 of desired widths. The maximum designable length does not include such a length that the divided electrodes 22 make contact with each other when screen-printed, or that a desired resistance cannot be formed.

Figure 14:
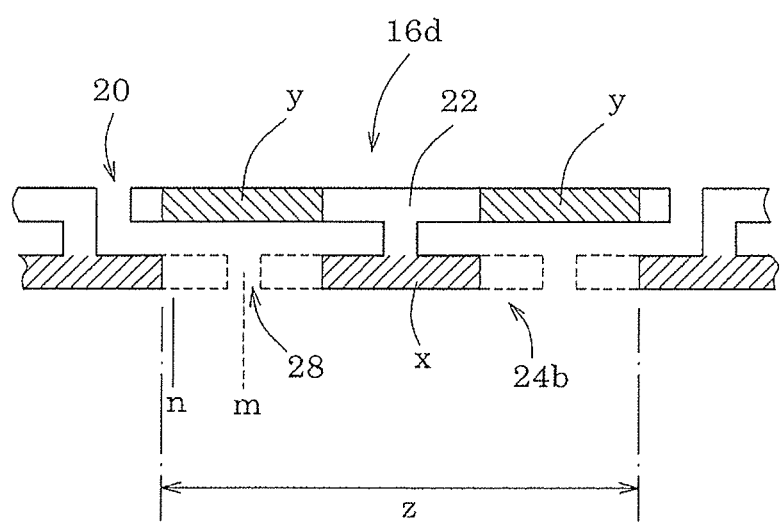
FIG. 14 is a diagram showing the case where the inner electrodes are shortened.
Figure 15:
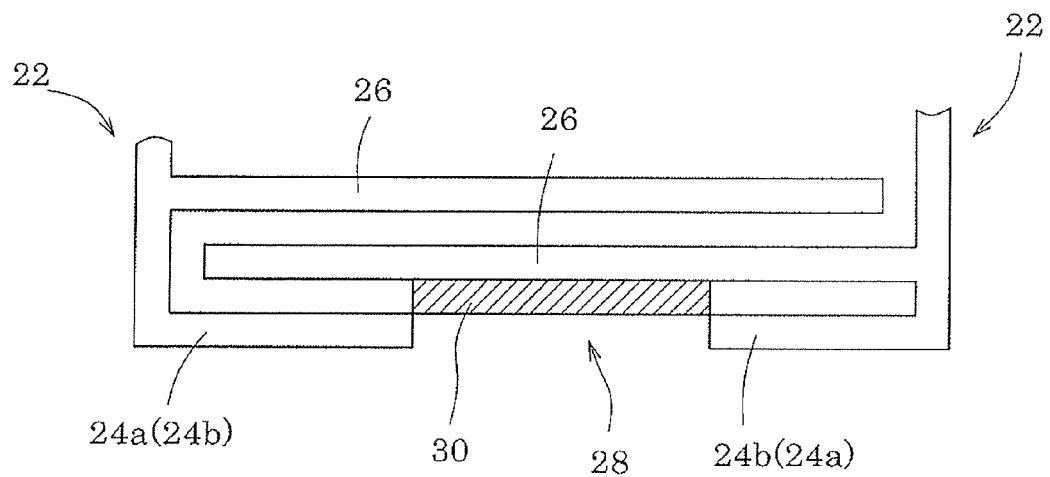
FIG. 15 is a diagram showing the provision of an insulating region in a gap.
Figure 16:
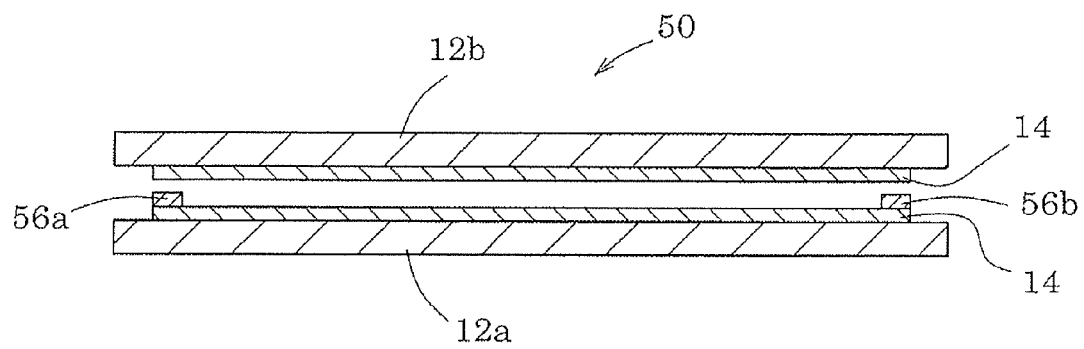
FIG. 16 is a diagram showing an example of a cross section of a conventional 5-wire touch panel.
Figure 17:
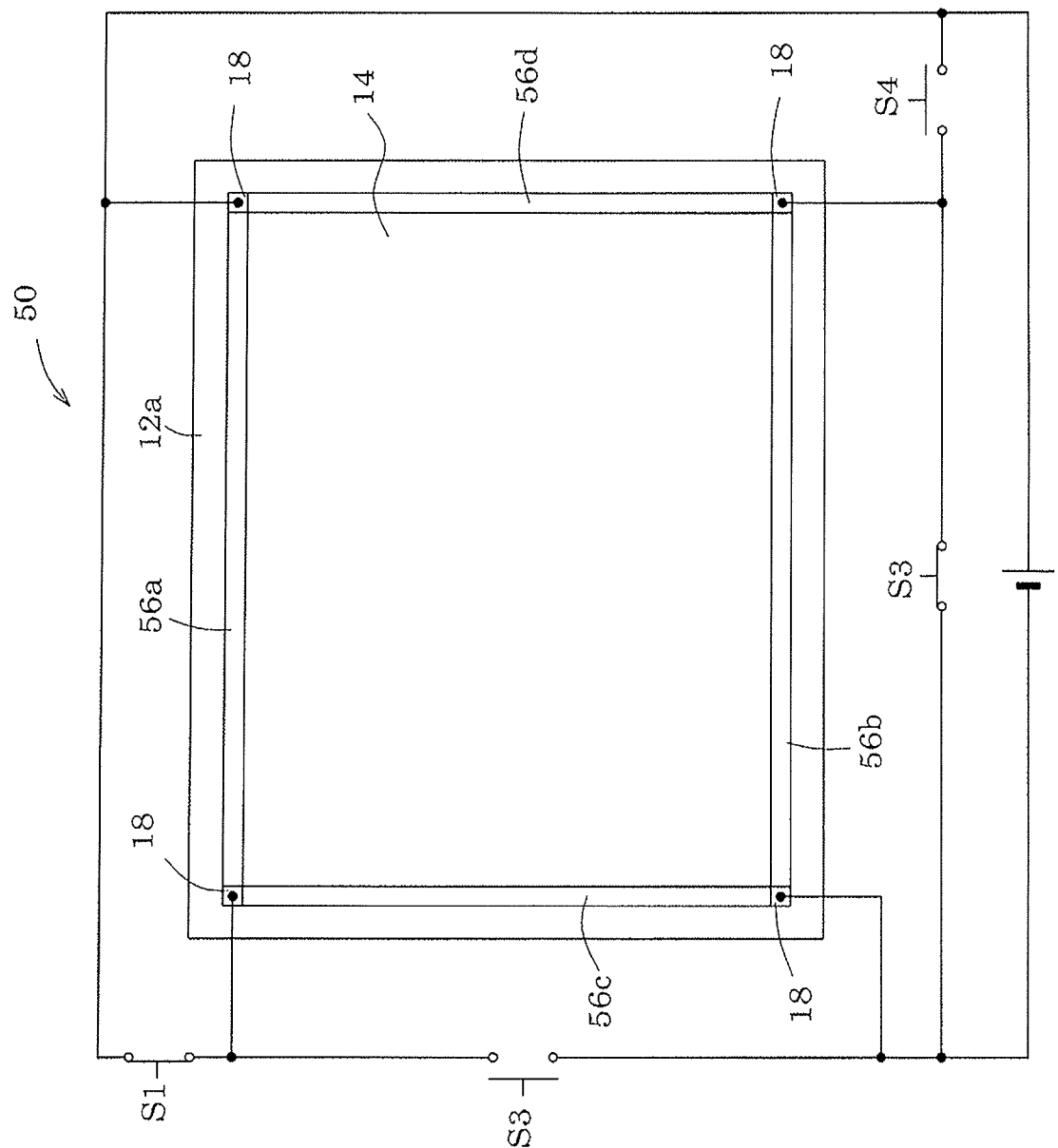
FIG. 17 is a diagram showing an example of a substrate on which the electrodes of FIG. 16 are formed and the peripheral circuitry thereof.
Figure 18:
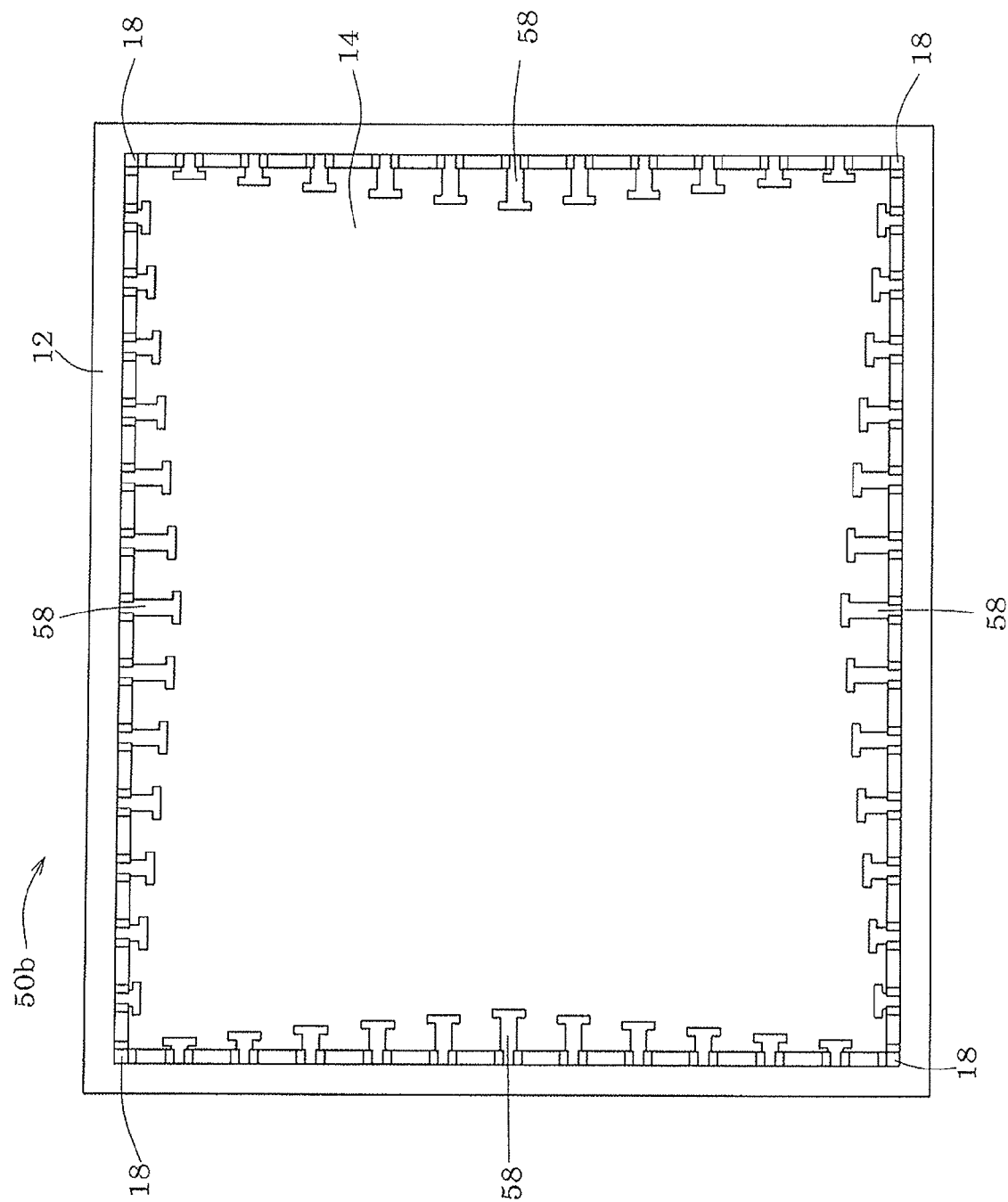
FIG. 18 is a diagram showing a touch panel disclosed in Japanese Laid-Open Patent Publication No. 04-137026 that includes T-shaped electrodes.

Since the length of each of the inner electrodes 24a and 24b is smaller than the maximum designable length, in the gap 20, a portion 28 across which the ends of the inner electrodes 24a and 24b oppose each other becomes larger (FIG. 14). This makes it likely that the potential of the pectinate outer electrode 26 on the innermost side of the resistive film 14 affects the formation of the equipotential lines through the gap. For example, as shown in FIG. 14, the shortening of the inner electrodes 24a and 24b causes portions x and y to affect the formation of the equipotential lines, and this makes the length of the inner electrode 24b equivalent to a length z. Due to the effect of this, the equipotential line that is to be placed at the center m of the gap 20 in the case of the maximum designable length shifts to a position n, and this complicates the design. The position n varies depending on the lengths of the inner electrodes 24a and 24b. Accordingly, as shown in FIG. 15, an insulating region 30 is formed by removing a portion of the resistive film 14 between the outer electrode 26 and the portion 28. Adjustments are made by extending or reducing the insulating region 30 in accordance with the arrangement of the actual equipotential lines so that the equipotential lines may be evenly arranged. The insulating region 30 is formed by removing a portion of the resistive film 14 by wet or dry etching.

As described above, the distortion of the equipotential lines is reduced with a simple design. Since the distortion of the equipotential lines is small, it is easier to accurately obtain the coordinates of the touch. In addition, since the equipotential lines are evenly arranged even near the electrodes 24a and 24b, it is possible to use a larger area of the resistive film 14.

The present invention can be carried out in other embodiments with various improvements, modifications, and variations made based on the knowledge of those skilled in the art without departing from the scope of the invention.

What is claimed is:

1. A touch panel comprising:
two substrates opposing each other at a particular distance;
resistive films formed on opposing surfaces of the substrates, respectively; and
electrodes formed along four sides of one of the resistive films,
each of the electrodes including a plurality of divided electrodes that are linearly arranged and resistances between the divided electrodes, the divided electrodes and the resistances being connected in series with each other,
each of the divided electrodes being made pectinate and comprising a straight-shaped inner electrode portion and an outer electrode portion other than the straight-shaped inner electrode portion, configured such that
the straight-shaped inner electrode portion is disposed at a first distance from a respective one of the four sides of the one of the resistive films, the first distance being greater than a second distance at which the outer electrode portion is disposed from the respective one of the four sides,
the straight-shaped inner electrode portions of the divided electrodes each extend parallel to the respective one of the four sides and are linearly arranged with respect to each other,
lengths of the straight-shaped inner electrode portion in each of the divided electrodes other than the straight-shaped inner electrode portions of the divided electrodes at both ends of the electrode are substantially the same,
a ratio of the length of each of the straight-shaped inner electrode portions of the divided electrodes at the both ends of the electrode to the length of each of the straight-shaped inner electrode portions of the other divided electrodes is from 0.1:1 to 0.5:1, and
the straight-shaped inner electrode portions of the divided electrodes at the both ends of the electrode are connected to respective power supply terminals.

2. The touch panel according to claim 1, wherein
adjacent divided electrodes among the divided electrodes oppose each other with a gap therebetween, a resistance value of a resistance between the adjacent divided electrodes is determined based on the shape of the gap and a sheet resistance of the resistive film, and the resistance values of all the resistances are substantially the same by making substantially the same gap widths and opposing lengths of all areas across which the divided electrodes oppose each other.

3. The touch panel according to claim 2, wherein
a portion of the one of the resistive films between an opposed portion of the straight-shaped inner electrode portion and the outer electrode portion is removed to form an insulating region in the gap, and equipotential lines formed by voltage applied to the resistive film from the straight shaped inner electrode portion are adjusted to be evenly arranged.

4. A touch panel comprising:
two substrates opposing each other at a particular distance;
resistive films formed on opposing surfaces of the substrates, respectively; and
electrodes formed along four sides of one of the resistive films,
each of the electrodes including a plurality of divided electrodes that are linearly arranged and resistances between the divided electrodes, the divided electrodes and the resistances being connected in series with each other,
each of the divided electrodes comprising a straight-shaped inner electrode portion and an outer electrode portion other than the straight-shaped inner electrode portion, configured such that
the straight-shaped inner electrode portion is disposed at a first distance from a respective one of the four sides of the one of the resistive films, the first distance being greater than a second distance at which the outer electrode portion is disposed from the respective one of the four sides,
lengths of the straight-shaped inner electrode portion in each of the divided electrodes other than the straight-shaped inner electrode portions of the divided electrodes at both ends of the electrode are substantially the same,
a ratio of the length of each of the straight-shaped inner electrode portions of the divided electrodes at the both ends of the electrode to the length of each of the straight-shaped inner electrode portions of the other divided electrodes is from 0.1:1 to 0.5:1, and the straight-shaped inner electrode portions of the divided electrodes at the both ends of the electrode are connected to respective power supply terminals.

\* \* \* \* \*